T. CUFF.
LOCKING DEVICE FOR THE STEERING GEARS OF AUTOMOBILES.
APPLICATION FILED MAY 21, 1915.
1,211,550. Patented Jan. 9, 1917.
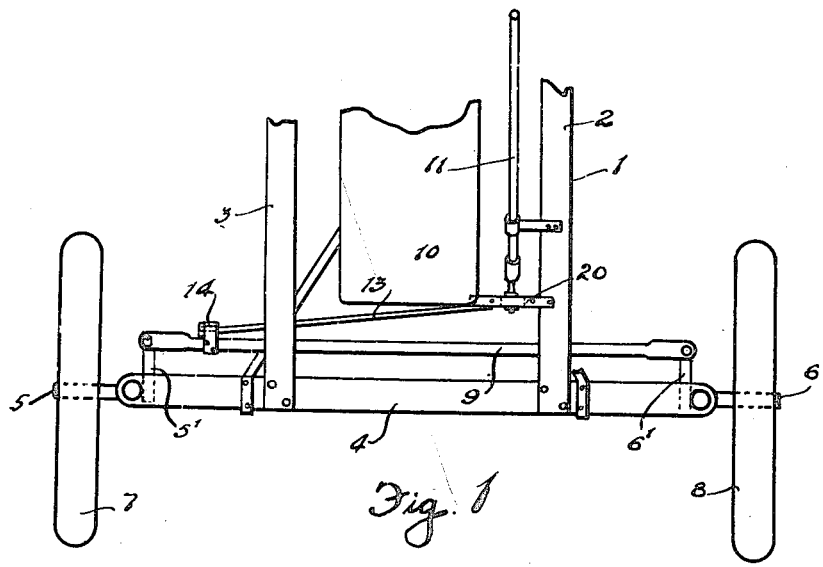
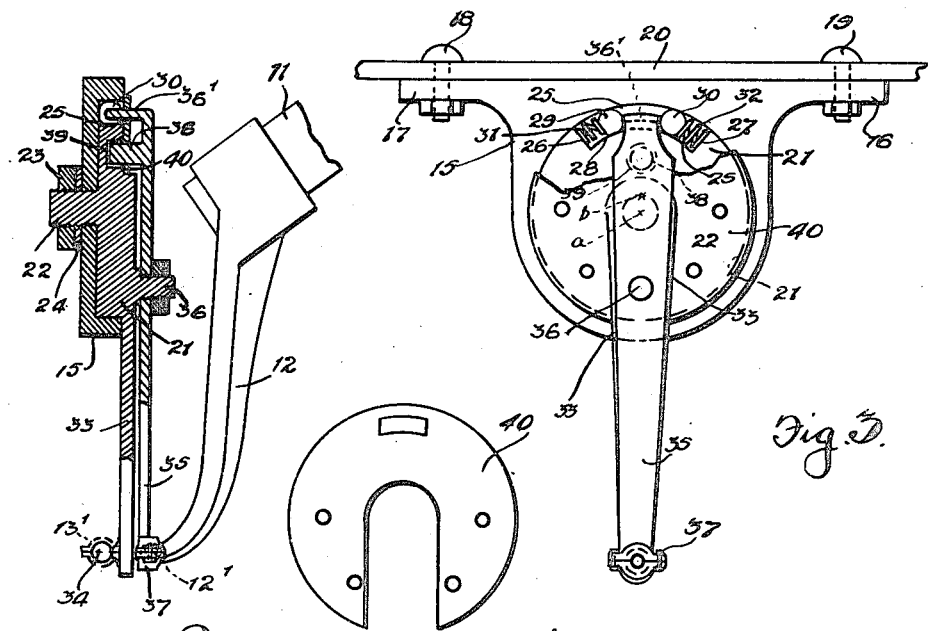
WITNESSES
INVENTOR

UNITED STATES PATENT OFFICE.

THOMAS CUFF, OF GOVAN, SASKATCHEWAN, CANADA.

LOCKING DEVICE FOR THE STEERING-GEARS OF AUTOMOBILES.

1,211,550.　　　　　Specification of Letters Patent.　　　Patented Jan. 9, 1917.

Application filed May 21, 1915. Serial No. 29,587.

*To all whom it may concern:*

Be it known that I, THOMAS CUFF, of the town of Govan, in the Province of Saskatchewan, Canada, have invented certain new and useful Improvements in Locking Devices for the Steering-Gears of Automobiles, of which the following is the specification.

The invention relates to improvements in locking devices for the steering gears of automobiles and the object of the invention is to provide a device which, when applied to the steering gear, will automatically lock the steering gear against movement in any position in which it is left, the device being specially adaptable to the type of steering gear as at present used on the Ford make of automobile.

A further object of the invention is to construct a device of the above class which can be applied on the car without modifying the present steering mechanism and also a device which can be constructed at small cost and which, when installed, can be positively relied upon for the purposes which it is provided.

With the above objects in view the invention consists essentially in a bearing block or plate suitably suspended from the automobile in a location adjacent the steering post, a disk rotatably mounted in the bearing plate and provided on the one side with a peripheral cross slot of varying width, spring pressed balls located in the slot, a pivoted release lever fitted with a ball socket at one end and at the opposite end with an offset trip projecting into the slot between the balls and an operating lever projecting from the disk, the parts being arranged, constructed and connected with the steering gear of the automobile as hereinafter more particularly described and later pointed out in the appended claim.

Figure 1 represents a plan view of the front of an automobile chassis showing the steering gear and my attachment applied. Fig. 2 is an enlarged detailed vertical sectional view through the attachment, the lower end of the steering post being shown in side elevation. Fig. 3 is a face view of the attachment, the cover plate being broken away to expose construction. Fig. 4 is a plan view of the cover plate.

In the drawing like characters of reference indicate corresponding parts in each figure.

1 represents the chassis of an automobile of which 2 and 3 are the side beams and 4 the front axle, said front axle being provided at the ends with the usual pivoted steering spindles 5 and 6 on which I have mounted the front wheels 7 and 8, the back-turned portions 5' and 6' of the spindles being connected by a steering rod 9 to effect the turning of the wheels together.

10 represents the engine suitably mounted on the chassis.

11 represents the steering post having the usual inclined position and carried by the usual brackets. The lower end of the post terminates in the operating crank 12.

13 represents the operating rod of the steering gear, connected at 14 to the steering rod 9.

The above parts are all of ordinary construction and the details thereof are not herein enlarged upon as they form no part of this invention. I wish to mention, however, that the inner end of the operating rod is customarily provided with a socket to receive the usual ball located at the extending end of the crank 12.

While the crank and operating rod are customarily connected, I might explain that in carrying out my invention no such connection is made although such parts are preserved in their present form.

My invention is now described.

15 is a bearing block or plate provided with outstanding lugs 16 and 17 fastened by means of bolts 18 and 19 to a supporting plate 20 secured to the beam 2 and the crank case on the engine 10 in a location more or less directly above the lower end of the steering wheel.

The bearing block is cored out to provide a bearing for a rotating disk 21 fitted with a centrally disposed projecting pin 22 which extends centrally through the front face of the bearing and is supplied with a nut 23 and washer 24. This pin centers the disk in the bearing block as well as holds it in position.

For purpose of description later appearing, I have indicated the point of the disk at "*a*," this center point being also the center point of the bearing in the plate which receives the disk.

The face of the disk is slotted away at the periphery as indicated at 25, the ends of the slot being shown at 26 and 27 while the inside wall of the slot is indicated at 28.

The outside of the slot is closed by the inner wall of the bearing in the plate which, as just referred to, is cut in the plate with the point "*a*" as center. The inner wall 28 of the slot is cut with the point "*b*" as center, that is, the radius at which it is cut is considerably less than the radius of the outer wall. Accordingly, the slot gradually becomes less in width in passing from the end walls 26 and 27 toward the center. In this slot I place two balls, 29 and 30, which are pushed continuously toward the center by the action of inserted springs 31 and 32. The arrangement, however, is such, that owing to the contraction of the slot the balls are jammed in the position shown in Fig. 3 of the drawing. Accordingly, under normal conditions, it will be impossible to turn the disk for the reason that if turned to the right the ball 30 would jam while if turned to the left the ball 29 would jam.

33 is an operating lever permanently secured to the disk and extending downwardly therefrom, the end of the lever terminating in a ball 34 which ball is designed to receive the ordinary socket 13' located at the inner end of the operating rod 13.

35 is a release lever pivotally mounted on a pin 36 projecting outwardly from the face of the lever 33. This releasing lever has the lower end thereof formed into a socket 37 designed to receive the usual ball 12' located at the end of the crank 12. The upper end of the lever is supplied with an offset trip 36' which passes into the slot between the balls 29 and 30. It is also supplied with an inwardly directed pin 38 which passes into a receiving opening 39 provided in the disk, such opening being somewhat larger than the pin which enters it.

40 is a cover plate attached to the disk and swinging with it, said cover plate being suitably cut to admit the lever 33, the pin 38 and the trip 36'.

In actual practice I contemplate making the disk, the pin 22, the pivot pin 36 and the lever 33 as one casting.

When applying this device on an automobile it is advisable to have the pin 22 more or less alined with the lower end of the steering post, thereby allowing the crank 12 and lever 33 to swing on a common center when the post is turned.

In order to better understand the invention I will now describe its action and operation.

Initially, it operates to hold the wheels locked in the position shown as said wheels cannot turn of themselves, in one direction or the other, without effecting a movement of the lever 33 and the consequent movement of the disk. The disk, however, cannot move, being locked by the balls. Accordingly, it will be seen, in the usual running of the machine, the customary twisting action of the front wheels, as found under the ordinary road conditions, is not allowed and is not transferred back to the steering post or hand wheel carried thereby. On the other hand, if the chauffeur or driver wishes to turn the automobile in the usual steering operation, he turns the steering post in the ordinary way. The turning of the post effects initially, through the crank 12, a swing, in a positive direction, of the release lever 35 and said lever, in swinging, carries with it one of the balls, the ball being forced against the action of its spring by the trip 36'. Only a small movement is here necessary, such movement being limited by the pin 38 which can only travel far enough to hit the side of the opening 39. Once the ball is in this way released, the release arm, in swinging further, carries with it the disk which is turned by the pin 38, the ball, of course, being still held back by the trip. It is then obvious that the disk, in turning, will effect the swinging of the operating lever 33 which in turn effects the shifting of the steering rod and the consequent turning of the steering wheels. In this connection it is to be noticed that immediately the chauffeur stops turning the steering post the wheels become locked, as the previously compressed spring operates to return the release lever to the initial position, in which position it cannot be unlocked by any action, due to the movement of the wheels, on the road.

What I claim as my invention is:—

In an automobile the combination with the steering wheels, the steering post and crank and the steering gear, said steering gear presenting an operating rod, of a suitably suspended locking device inserted between the crank of the post and the operating rod and presenting a suitably suspended stationary bearing block located adjacent the crank, a disk received by and rotatably mounted in the block and having a peripheral slot therein having the outer side thereof closed by the material of the bearing block and having the width thereof gradually decreasing in passing from the ends toward the center, an operating lever extending from the disk and permanently associated with the same and having the extending end connected with the operating rod, a releasing lever pivotally secured to the disk and having the outer end thereof connected with the crank and the inner end thereof offset to form a trip extending into the slot, spring pressed balls contained within the slot and located at opposite sides of the trip and a stop pin extending inwardly from the latter lever into an opening provided in the disk of larger dimension than the pin, as and for the purpose specified.

Signed at Govan, Sask., this 11th day of May, 1915.

THOS. CUFF.

In the presence of—
D. J. KIPPAR,
CHAS. APPLEGATE.